United States Patent
Wang et al.

(10) Patent No.: US 11,086,176 B2
(45) Date of Patent: Aug. 10, 2021

(54) TRANSPARENT PANEL, FABRICATION METHOD THEREOF, AREA LIGHT SOURCE AND DISPLAY DEVICE

(71) Applicant: BOE TECHNOLOGY GROUP CO., LTD., Beijing (CN)

(72) Inventors: Long Wang, Beijing (CN); Chiehhsing Chung, Beijing (CN); Changcheng Ju, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 651 days.

(21) Appl. No.: 15/777,610

(22) PCT Filed: Dec. 8, 2017

(86) PCT No.: PCT/CN2017/115172
§ 371 (c)(1),
(2) Date: May 18, 2018

(87) PCT Pub. No.: WO2018/171261
PCT Pub. Date: Sep. 27, 2018

(65) Prior Publication Data
US 2021/0181560 A1    Jun. 17, 2021

(30) Foreign Application Priority Data

Mar. 24, 2017    (CN) .......................... 201710183012.6

(51) Int. Cl.
*G02F 1/1347*    (2006.01)
*G02F 1/13357*    (2006.01)

(52) U.S. Cl.
CPC .... *G02F 1/13471* (2013.01); *G02F 1/133615* (2013.01)

(58) Field of Classification Search
CPC ........... G02F 1/13471; G02F 1/133615; G02F 1/134309
See application file for complete search history.

(56) References Cited

U.S. PATENT DOCUMENTS

2007/0171668 A1    7/2007  Pan et al.
2009/0244694 A1*  10/2009  Zakoji .................. H04N 9/3161
                                                              359/326

(Continued)

FOREIGN PATENT DOCUMENTS

CN    1410816 A    4/2003
CN  101769477 A    7/2010

(Continued)

OTHER PUBLICATIONS

International Search Report & Written Opinion dated Mar. 7, 2018, regarding PCT/CN2017/115172.

*Primary Examiner* — Lucy P Chien
(74) *Attorney, Agent, or Firm* — Intellectual Valley Law, P.C.

(57) ABSTRACT

A transparent panel includes a first substrate, a second substrate, and a plurality of pixel regions. The second substrate is opposite to the first substrate. The plurality of pixel regions are between the first substrate and the second substrate. Each of the pixel regions includes a first region and a second region. A scattering degree of the first region is greater than a scattering degree of the second region. An area ratio of the first region to the second region in a pixel region increases as a distance between the pixel region and at least one side of the transparent panel increases.

19 Claims, 9 Drawing Sheets

(56) References Cited

U.S. PATENT DOCUMENTS

| | | | | |
|---|---|---|---|---|
| 2010/0091219 A1* | 4/2010 | Rho | ............... | G02F 1/133617 |
| | | | | 349/68 |
| 2010/0165450 A1* | 7/2010 | Okuyama | ......... | G02F 1/133615 |
| | | | | 359/315 |
| 2016/0116811 A1 | 4/2016 | Zheng | | |
| 2016/0178940 A1 | 6/2016 | Yuan et al. | | |

FOREIGN PATENT DOCUMENTS

| | | |
|---|---|---|
| CN | 104330910 A | 2/2015 |
| CN | 104570457 A | 4/2015 |
| CN | 105954937 A | 9/2016 |
| CN | 106292030 A | 1/2017 |

* cited by examiner

TRANSPARENT PANEL, FABRICATION METHOD THEREOF, AREA LIGHT SOURCE AND DISPLAY DEVICE

CROSS-REFERENCE TO RELATED APPLICATION

This PCT patent application is a national stage application under 35 U.S.C. § 371 of International Application No. PCT/CN2017/115172, filed Dec. 8, 2017, which claims priority to Chinese Patent Application No. 201710183012.6, filed on Mar. 24, 2017, the entire contents of which are incorporated herein by reference.

TECHNICAL FIELD

The present disclosure generally relates to the field of display technologies and, more particularly, to a transparent panel, fabrication method thereof, area light source and display device.

BACKGROUND

Transparent displays can achieve display functions while allowing light to pass through. Display technology based on polymer-stabilized liquid crystal allows the display panel to stay in a transparent state without an applied voltage.

However, the polymer-stabilized liquid crystal panel technology needs a light source inputting light from a side of the panel, the amount of light introduced in the panel gradually decreases with an increasing distance between a pixel region and the light source. As a result, the amount of light that can be scattered from the pixel region decreases, and thus luminance over the entire display panel is non-uniform. Accordingly, a quality of the display image is reduced.

SUMMARY

In one aspect, the present disclosure provides a transparent panel. The transparent panel includes a first substrate, a second substrate, and a plurality of pixel regions. The second substrate is opposite to the first substrate. The plurality of pixel regions are between the first substrate and the second substrate. Each of the pixel regions includes a first region and a second region. A scattering degree of the first region is greater than a scattering degree of the second region. An area ratio of the first region to the second region in a pixel region increases as a distance between the pixel region and at least one side of the transparent panel increases.

In some embodiments, the area ratio increases evenly as the distance between the pixel region and the at least one side of the transparent panel increases.

In some embodiments, area ratios in pixel regions having same distances from the at least one side of the transparent panel are the same.

In some embodiments, an area of the first region in one of the pixel regions that is farthest from the at least one side of the transparent panel is a first area. An area of the first region in another one of the pixel regions that is closest to the at least one side of the transparent panel is a second area. A ratio of the first area to the second area is greater than approximately 1, and smaller than or equal to approximately 5.

In some embodiments, a pattern of the second region is adjacent to a pattern of the first region in at least one of the pixel regions.

In some embodiments, the first region includes a continuous pattern or a plurality of discrete patterns in the at least one of the pixel regions.

In some embodiments, the transparent panel further include a liquid crystal mixture layer between the first substrate and the second substrate. The liquid crystal mixture layer includes first portions in the first regions and second portions in the second regions. A polymerization degree of the first portions is greater than a polymerization degree of the second portions. The first portions of the liquid crystal mixture layer include a liquid crystal molecule aligned perpendicular to a surface of the transparent panel and a polymer network. The second portions of the liquid crystal mixture layer include a liquid crystal molecule and a polymerizable monomer.

In some embodiments, the transparent panel further includes at least one of an ultraviolet light blocking layer over one side of the first substrate or an ultraviolet light blocking layer over one side of the second substrate.

In some embodiments, the transparent panel further includes an electrode layer arranged over one side of the first substrate or over one side of the second substrate. The electrode layer includes a plurality of electrode patterns in one or more first regions.

In some embodiments, the transparent panel further includes an electrode layer arranged over one side of the first substrate or over one side of the second substrate. The electrode layer includes a plurality of electrode patterns, the plurality of electrode patterns being in one or more first regions.

Another aspect of the present disclosure provides an area light source. The area light source includes a transparent panel and at least one side-lit light source located over the at least one side of the transparent panel.

In some embodiments, the area ratio of the first region to the second region in the pixel region gradually increases along a direction from the at least one side of the transparent panel to an opposing side of the transparent panel.

In some embodiments, the side-lit light source is a first side-lit light source and the one side is a first side of the transparent panel. The area light source further includes a second side-lit light source arranged over a second side of the transparent panel that is opposite to the first side of the transparent panel. The area ratio of the first region to the second region in the pixel region gradually increases along directions from the first side and the second side to a central axis of the transparent panel.

In some embodiments, the area light source further includes a third side-lit light source arranged over a third side of the transparent panel that is nonparallel to the first side and the second side and a fourth side-lit light source arranged over a fourth side of the transparent panel that is opposite to the third side of the transparent panel. The area ratio of the first region to the second region in the pixel region gradually increases along directions from the first side, the second side, the third side, and the fourth side to a central point of the panel.

Another aspect of the present disclosure provides a display device including an area light source. Each of the at least one side-lit light source includes a red light sub-source, a green light sub-source, and a blue light sub-source. The red light sub-source, the green light sub-source, and the blue light sub-source emit red light, green light, and blue light sequentially to form color light by superimposing the red light, the green light, and the blue light.

Another aspect of the present disclosure provides a display device including an area light source. Each of the at least one side-lit light source includes a white light source providing white light. The transparent panel further includes a color filter film over a light-emission direction. The color filter film includes a plurality of red filters, a plurality of green filters, and a plurality of blue filters. Red light, green light, and blue light are formed by passing white light through the color filter film. The red light, the green light, and the blue light are superimposed to form color light.

In some embodiments, the color filter film is a color filter film of a quantum dot type or an organic light-emitting material type.

Another aspect of the present disclosure provides a method of fabricating a transparent panel. The method includes forming a liquid crystal mixture layer between the first substrate and the second substrate, the liquid crystal mixture including a liquid crystal molecule and a polymerizable monomer; and irradiating the liquid crystal mixture layer with ultraviolet light, such that a polymerization degree of the liquid crystal mixture layer in the first region is greater than a polymerization degree of the liquid crystal mixture layer in the second region.

In some embodiments, irradiating the liquid crystal mixture layer with ultraviolet light includes irradiating the liquid crystal mixture layer with ultraviolet light using a mask plate including portions for shielding the second regions.

BRIEF DESCRIPTION OF THE FIGURES

The following drawings are merely examples for illustrative purposes according to various disclosed embodiments and are not intended to limit the scope of the present disclosure.

DETAILED DESCRIPTION

Exemplary embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the exemplary embodiments of the present disclosure further described in detail with reference to the accompanying drawings.

Shapes and sizes of components in the accompany drawings are merely for illustrative purposes, and do not represent actual proportions of the components.

Transparent display technologies based on liquid crystal display and electroluminescent display may have a relatively low transmittance during displaying in a transparent manner, causing a degradation of displayed image. Although transparent display technologies based on polymer dispersed liquid crystal (PDLC) display, electrochromic display, and electrowetting display can improve a light transmittance, a response speed may be slow. In addition, most transparent displays may stay in a transparent state only when a voltage is applied, and may not stay in the transparent state without an applied voltage.

The polymer-stabilized liquid crystal display technology not only may enable the display panel to stay in a transparent state without an applied voltage, but also may improve the display response speed. In the polymer-stabilized liquid crystal display technology, during display, a voltage may be applied to a preset region, causing a liquid crystal molecule to rotate accordingly. The liquid crystal molecule may be influenced by the polymer, such that orientations of the liquid crystal molecule may be disordered. As a result, light entering the display panel may be scattered, and thus display may be realized. However, because a light source needed for the polymer-stabilized liquid crystal display technology may input light from a side of the display panel, the amount of light introduced in the display panel may gradually decrease as a distance between a pixel region and the light source increases. Accordingly, the amount of light that can be scattered from the pixel region may decrease, resulting in non-uniform luminance over the entire display panel, and reducing a quality of the display image.

Figure 1A:
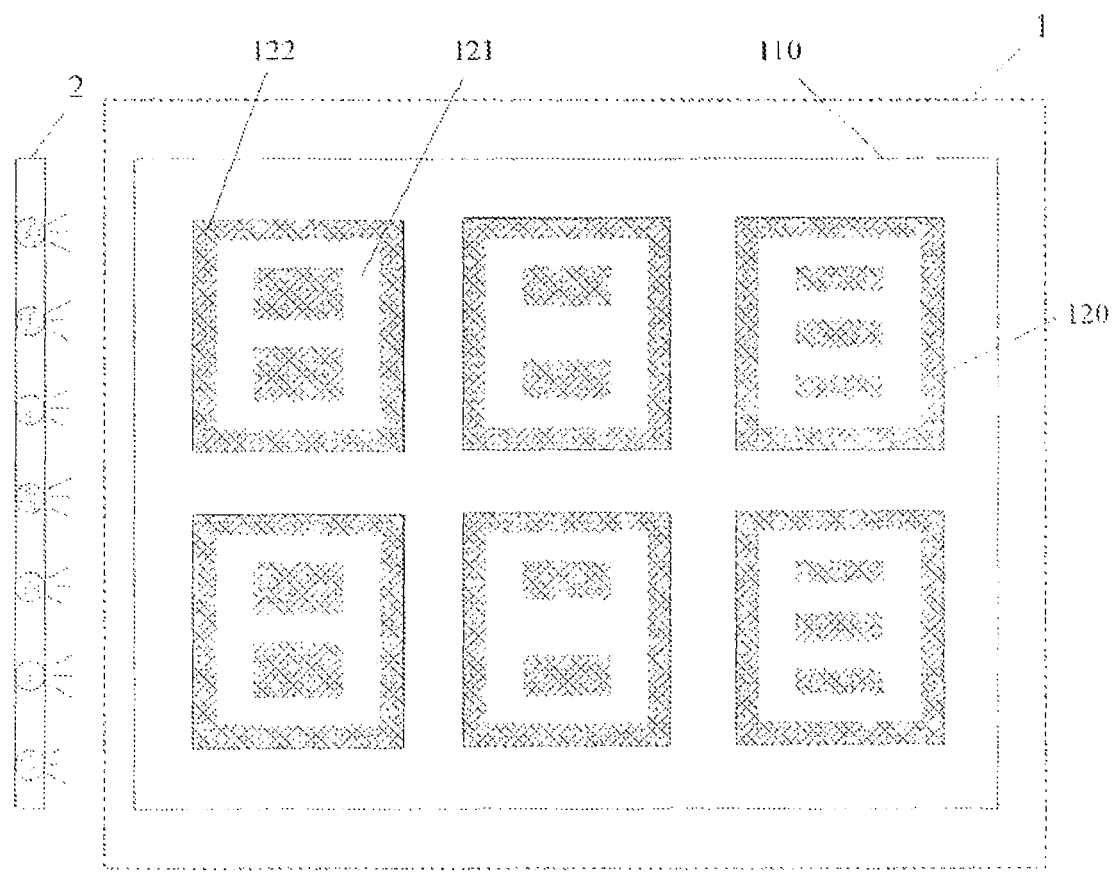
FIGS. 1A and 1B illustrate schematic views of exemplary display devices according to various disclosed embodiments of the present disclosure.
Figure 1B:
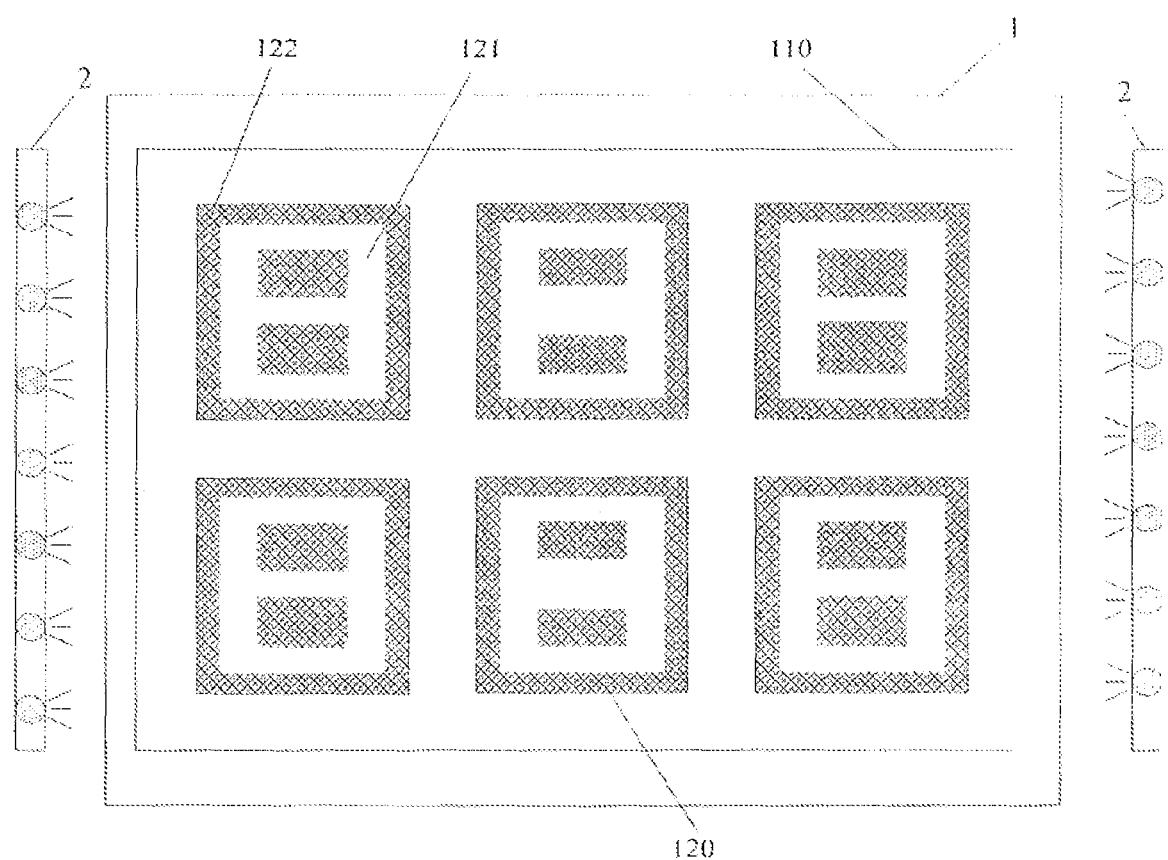

The present disclosure provides a transparent display panel, i.e., a transparent panel. The transparent display panel can include, for example, an array substrate and a counter substrate arranged face-to-face. FIGS. 1A and 1B illustrate schematic views of exemplary display devices according to various disclosed embodiments of the present disclosure. As shown in FIGS. 1A and 1B, each of the display devices includes a transparent display panel 1 and one or more light sources 2. The transparent display panel 1 includes an array substrate 110 and a counter substrate (not shown in FIG. 1A or FIG. 1B). The light source 2 can be an edge-lit light source. Herein, an edge-lit light source can also be referred to as a side-lit light source.

A plurality of pixel regions 120 arranged in an array are provided between the array substrate 110 and the counter substrate. Each pixel region 120 includes a display region 121 and a light transmission region 122. A pixel may refer to an element of a display panel for displaying a digital image. A pixel region may refer to a region that corresponds to one or more pixels. A scattering degree of the display region may be greater than a scattering degree of the light transmission region.

As a distance between the pixel region 120 and the edge-lit light source 2 arranged on one side of the transparent display panel increases, an area ratio of the display region 121 to the light transmission region 122 in the pixel region 120 increases.

One or more sides of a transparent display panel described herein refer to one or more edge sides of a transparent display panel. For example, a transparent display panel may have four edge sides, one front surface and one back surface. Correspondingly, one or more sides of the transparent display panel may refer to one or more edge sides among the four edge sides.

In the transparent display panel of the present disclosure, a relative area of the display region, e.g., an area of the display region with respect to an area of the light transmission region or an area of the entire pixel region, may be increased in a pixel region farther from the light source, by adjusting the area ratio of the display region to the light transmission region in the pixel region. Accordingly, an influence of a pixel region near the light source on luminance of a pixel region away from the light source may be reduced, and the luminance of the pixel region at a distance away from the light source may be increased. Thus, the luminance difference caused by the light loss may be compensated, and the luminance uniformity of the entire display panel may be improved.

In the transparent display panel of the present disclosure, the transparent display panel may receive incident light provided by one or more edge-lit light sources. After the incident light enters the transparent display panel, the liquid crystal mixture layer not only may serve as a light guide plate for transmission of the incident light, but also may realize the display. However, if the areas of the display regions in the pixel regions are equal to each other, then along a propagation direction of the incident light, more scattered light may exist in pixel regions near the light source, and scattered light may be gradually reduced at pixel regions away from the light source, resulting in reduced luminance uniformity of the entire display panel. Thus, in order to maintain the luminance uniformity of the entire display panel and to control the amount alight emitted from each pixel region, the area of the display region in each pixel region may need to be adjusted.

In some embodiments, in order to conveniently control an variation amplitude of the area ratio of the display region to the light transmission region in the pixel region and thus to have relatively uniform luminance of the entire transparent display panel, in the above-described transparent display panel of the present disclosure, the area ratio of the display region to the light transmission region in a pixel region may be, for example, increased with the increasing distance between the pixel region and the edge-lit light source arranged on at least one side of the transparent display panel. With the increasing distance between the pixel region and the edge-lit light source arranged on at least one side of the transparent display panel, scattered light in a unit area of the display region may reduce, causing a decrease of scattered light in the pixel region. Various methods may suppress the decrease of scattered light in the pixel region due to the increasing distance between the pixel region and the edge-lit light source arranged on at least one side of the transparent display panel. In some embodiments, the area ratio of the display region to the light transmission region in a pixel region may be increased evenly, i.e., linearly, with the increasing distance between the pixel region and the edge-lit light source arranged on at least one side of the transparent display panel, in order to suppress the decrease of scattered light in the pixel region due to the increasing distance between the pixel region and the edge-lit light source arranged on at least one side of the transparent display panel. In some other embodiments, the area ratio of the display region to the light transmission region in a pixel region may be increased nonlinearly with respect to the increasing distance between the pixel region and the edge-lit light source arranged on at least one side of the transparent display panel, in order to suppress the decrease of scattered light in the pixel region due to the increasing distance between the pixel region and the edge-lit light source arranged on at least one side of the transparent display panel.

For example, the area ratio of the display region to the light transmission region in a pixel region may be increased stepwise with the increasing distance between the pixel region and the edge-lit light source arranged on at least one side of the transparent display panel. In the present disclosure, the manner of increasing the area ratio of the display region to the light transmission region in a pixel region is not restricted, and may be selected according to various application scenarios.

In some embodiments, in order to reduce a complexity of fabrication process, when the area ratio of the display region to the light transmission region in each pixel region is configured, in the transparent display panel of the present disclosure, the area ratio of the display region to the light transmission region in each of pixel regions having same distances from the edge-lit light source may generally be configured to be the same. For example, as shown in FIGS. 1A and 1B, the area ratio of the display region 121 to the light transmission region 122 is configured to be the same in the pixel regions located in a same column.

In some embodiments, in order to achieve uniform luminance of a transparent display panel having a relatively large size, the pixel regions closest to the edge-lit light source may be covered completely by the light transmission regions without display regions, and the pixel regions farthest from the edge-lit light source may be covered completely by the display regions without light transmission regions, which may be rare cases that may rarely happen. Generally, in sonic embodiments, the display region and the light transmission region both may be included in the pixel regions of the entire transparent display panel. Further, if a size of the transparent display panel is relatively large, the difference between the area ratio of the display region to the light transmission region in a pixel region farthest from the edge-lit light source and the area ratio of the display region to the light transmission region in a pixel region closest to the edge-lit light source may be relatively large. That is, if the size of the transparent display panel is increased, the difference between the area ratio of the display region to the light transmission region in the pixel region farthest from the edge-lit light source and the area ratio of the display region to the light transmission region in the pixel region closest to the edge-lit light source may increase.

In this disclosure, an area of the display region in the pixel region farthest from the edge-lit light source is also referred to as a "first area," and an area of the display region in the pixel region closest to the edge-lit light source is also referred to as a "second area." In some embodiments, a ratio of the first area to the second area may be greater than approximately 1, and less than or equal to approximately 5.

In some embodiments, the ratio of the first area to the second area may be set to approximately 2 or approximately 3 to fit general sizes of display panels, such that luminance of the display panels is uniform.

In some embodiments, in order to realize that the area ratio of the display region to the light transmission region in the pixel region gradually increases with an increasing distance between the pixel region and the edge-lit light source arranged on at least one side of the transparent display panel, pixel regions may need to be patterned. Further, a relative area of the display region in a pixel region close to the edge-lit light source may be relatively small, and the relative area of the display region may increase, as a distance between the pixel region and the edge-lit light source increases. Thus, in some embodiments, in the above-described transparent display panel of the present disclosure, a pattern of the light transmission region may be adjacent to a pattern of the display region in the pixel region, e.g., the light transmission region may surround the display region or the light transmission region and the display region may be arranged side by side. Accordingly, the display region may be distributed over the pixel region, such that not only a uniformity of light emission in each pixel region may be improved, but also a ratio of the area increase of the display region may be controlled in each pixel region.

As described above, in the transparent display panel of the present disclosure, the light transmission region may be adjacent to the display region. In addition, in some embodiments, the display region in the pixel region may include a continuous pattern or a plurality of discrete patterns, such that the display region may be distributed over the entire pixel region, and the uniformity of light emission in each pixel region may be improved.

Figure 2A:
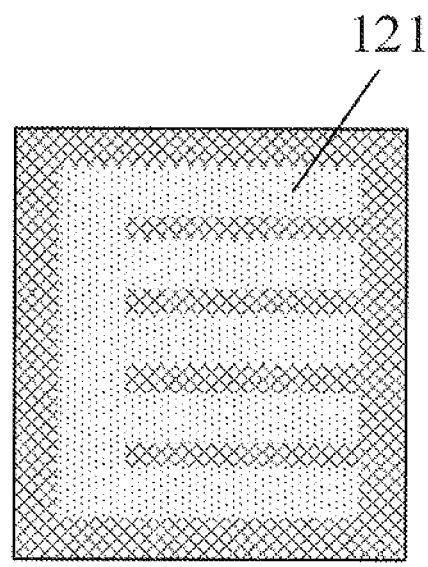
FIGS. 2A to 2F illustrate schematic views of exemplary pixel regions according to various disclosed embodiments of the present disclosure.
Figure 2B:
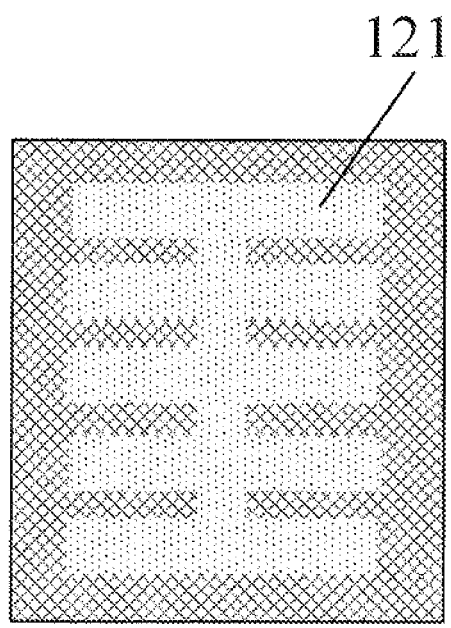
Figure 2C:
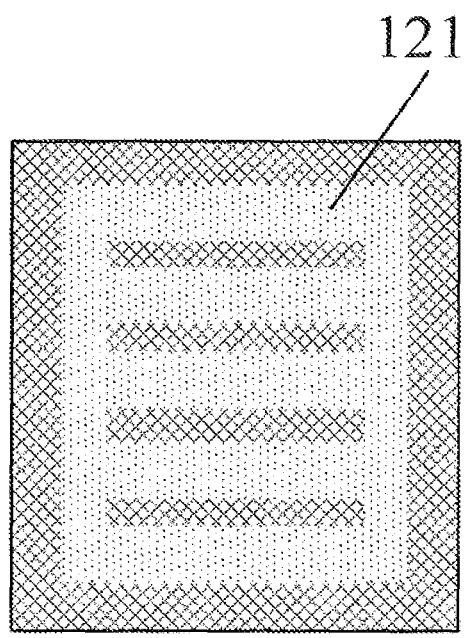
Figure 2D:
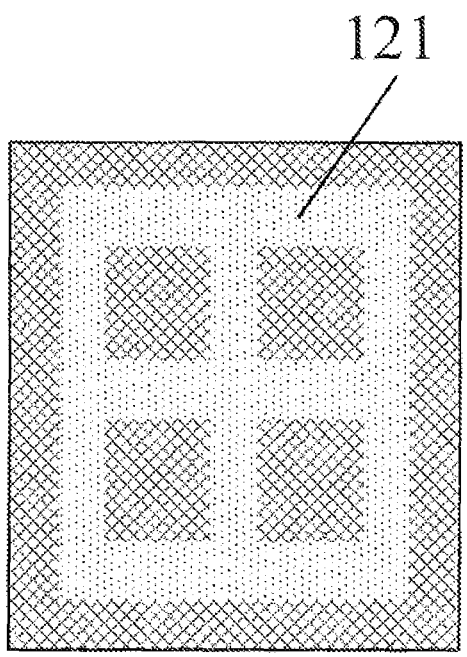
Figure 2E:
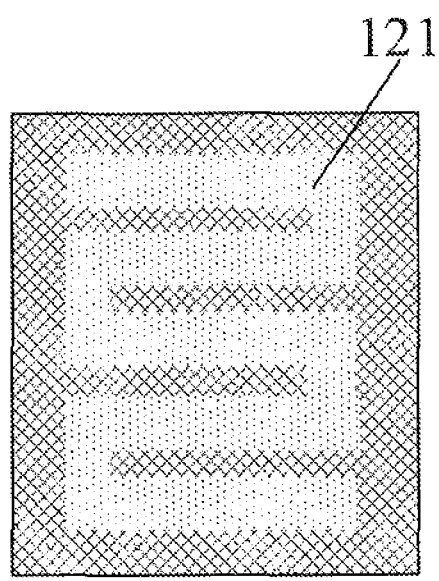
Figure 2F:
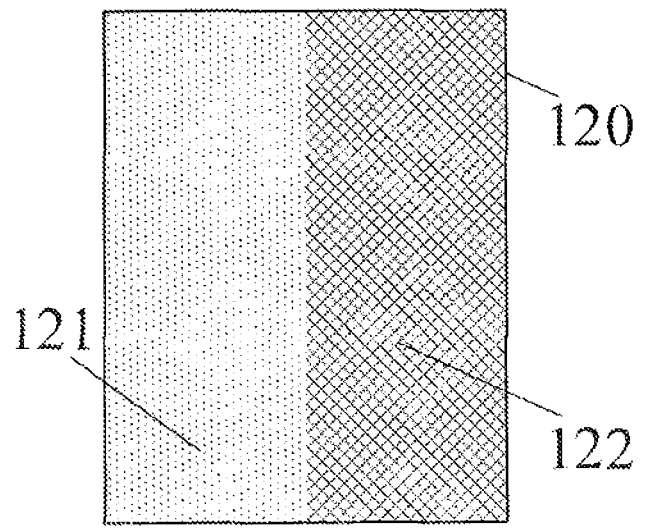

FIGS. 2A-2F show various exemplary pixel regions having continuous patterns for the display region 121. In some embodiments, the pattern of the display region 121 can include, for example, a comb-shape pattern shown in FIG. 2A, a fishbone-shape pattern shown in FIG. 2B, a window-blind-shape pattern shown in FIG. 2C, a window-shape pattern shown in FIG. 2D, a zigzag-shape pattern shown in FIG. 2E, or another appropriate shape. The continuous pattern fix the display region can include any continuous pattern formed by lines, which is not restricted in the present disclosure. In FIG. 2F, the display region 121 and the light transmission region 122 are arranged side by side.

Figure 3A:
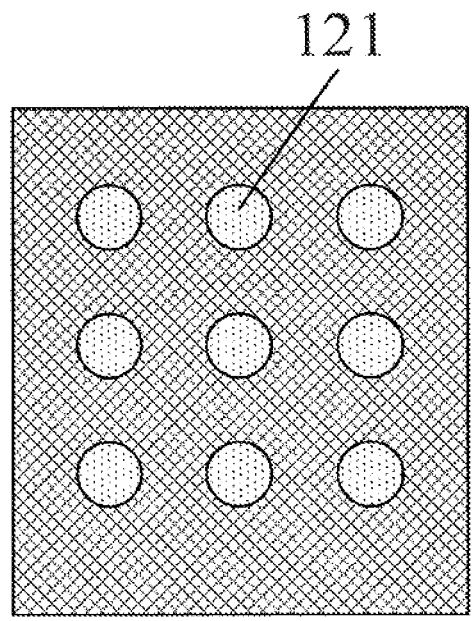
FIGS. 3A and 3B illustrate schematic views of exemplary pixel regions according to various disclosed embodiments of the present disclosure.
Figure 3B:
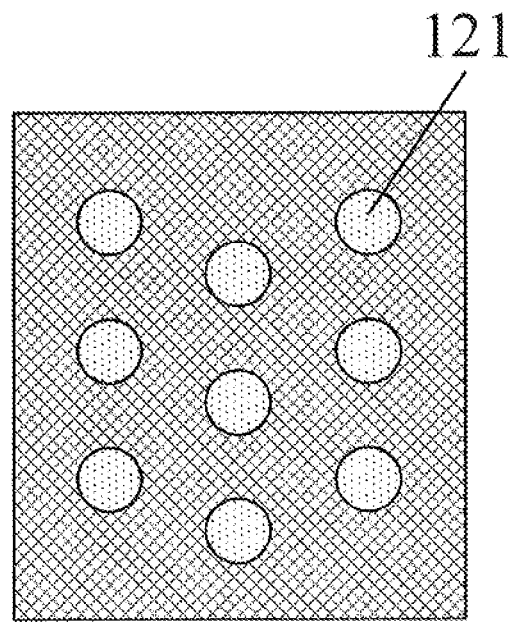

FIGS. 3A and 3B show various exemplary pixel regions having discrete patterns for the display region 121. In some embodiments, the pattern of the display region 121 may include, for example, a lattice formed of a plurality of discrete dots that can be arranged regularly as shown in FIG. 3A or arranged in an interlaced manner as shown in FIG. 3B. Further, a shape of each discrete dot can include, for example, a square, a circle, a polygon, or another appropriate shape. Further, when the pattern of the display region 121 includes a plurality of discrete patterns, the pattern of the display region 121 is not limited to the plurality of discrete dots, and can include a combination of a continuous pattern and a plurality of discrete patterns, which is not restricted in the present disclosure.

Figure 4:
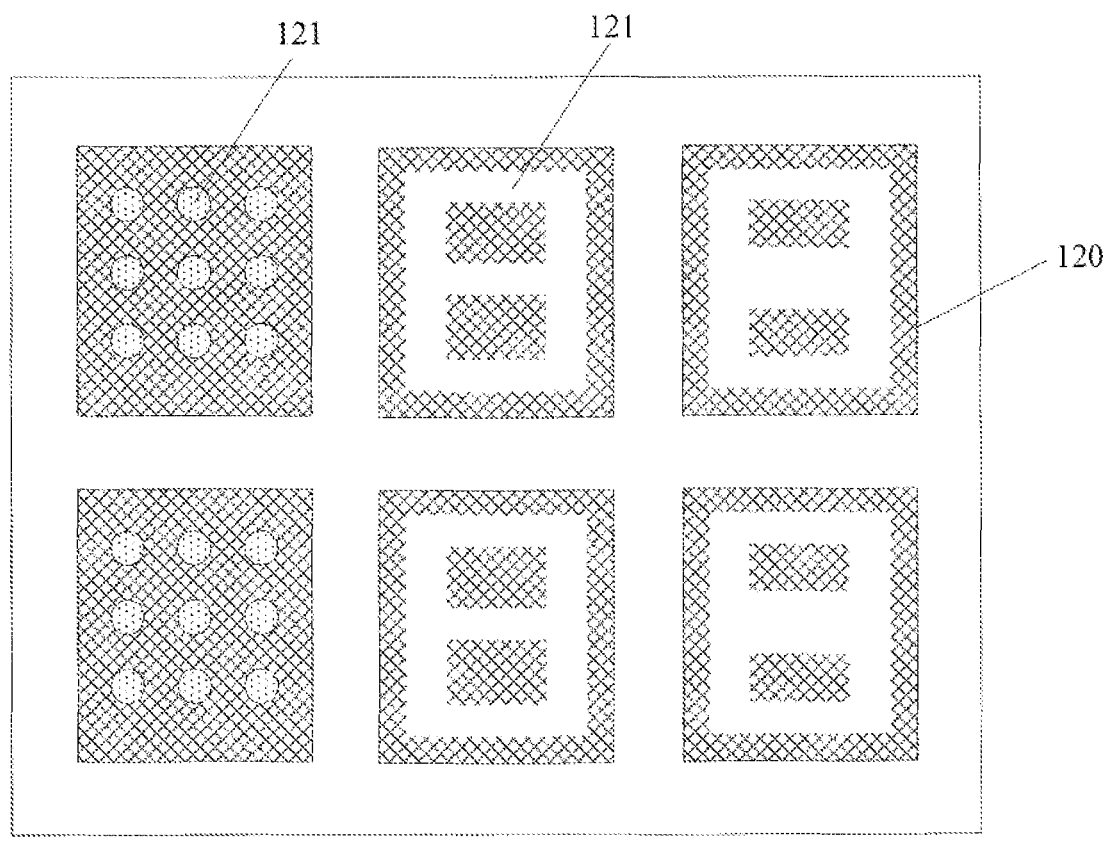
FIG. 4 illustrates a top view of an exemplary transparent display panel according to various disclosed embodiments of the present disclosure.

In some embodiments, patterns of the display regions located in different pixel regions may be the same, partially same, or different. FIG. 4 shows another exemplary transparent display panel consistent with embodiments of the disclosure. As shown in FIG. 4, in pixel regions 120 of the transparent display panel, a pattern of display region 121 of each pixel region in a first column includes an array formed of circular dots. Further, a pattern of display region 121 of each pixel region in the second and third columns includes a continuous pattern formed of lines. Patterns of the display regions 121 in the pixel regions may be selected such that the area ratio of the display region 121 to the light transmission region 122 in the pixel region may gradually increase with an increasing distance between the pixel region and the edge-lit light source arranged on at least one side of the transparent display panel. In the present disclosure, patterns of the display regions 121 in the pixel regions are not restricted, and can be selected according to various application scenarios.

Patterning the above-described display region may include, for example, one or more processes described below.

In some embodiments, monomer molecules in the liquid crystal mixture layer of the transparent display panel may be selectively polymerized, such that a portion of the liquid crystal mixture layer corresponding to the display region may include a liquid crystal molecule and a polymer network, and a portion of the liquid crystal mixture layer corresponding to the light transmission region may include a liquid crystal molecule and a polymerizable monomer. The portion of the liquid crystal mixture layer corresponding to the display region may refer to a portion of the liquid crystal mixture layer having an orthogonal projection on the array substrate overlapping with an orthogonal projection of the display region on the array substrate. The portion of the liquid crystal mixture layer corresponding to the light transmission region may refer to a portion of the liquid crystal mixture layer having an orthogonal projection on the array substrate overlapping with an orthogonal projection of the light transmission region.

In some other embodiments, a pixel electrode located in the pixel region may be patterned, such that the pixel electrode may have a pattern of a display region. That is, an orthogonal projection of the pixel electrode on the array substrate may fully overlap with an orthogonal projection of the display region on the array substrate.

In some other embodiments, by printing, the display region may be configured to include a liquid crystal mixture layer including a liquid crystal molecule and a polymer network. Correspondingly, the light transmission region may be configured to include a liquid crystal mixture layer including a liquid crystal molecule or a polymerizable monomer, or may be configured to not include a liquid crystal mixture layer. Patterning the display region may include, for example, one of the above processes, or a combination of two selected from the above processes, which is not restricted in the present disclosure.

For example, patterning of the display region including a combination of two selected from the above processes is described in detail below.

Figure 5:
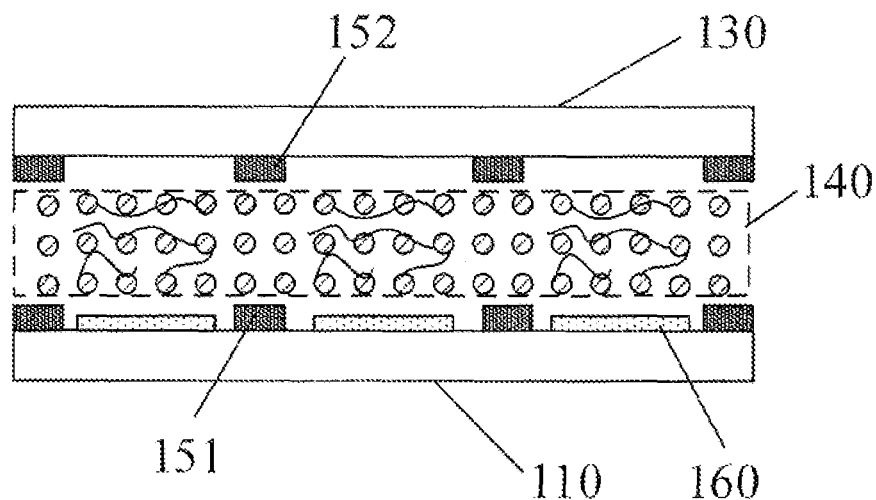
FIG. 5 illustrates a side view of an exemplary transparent display panel according to various disclosed embodiments of the present disclosure.

FIG. 5 illustrates a side view of an exemplary transparent display panel according to various disclosed embodiments of the present disclosure. As shown in FIG. 5, in addition to the array substrate 110 and the counter substrate 130, the transparent display panel further includes a liquid crystal mixture layer 140 located between the array substrate 110 and the counter substrate 130, as indicated by the dashed box.

A portion of the liquid crystal mixture layer 140 corresponding to a display region includes a liquid crystal molecule aligned in a direction perpendicular to the incident light direction of the edge-lit light source, and a polymer network surrounding the liquid crystal molecule. The portion of the liquid crystal mixture layer 140 corresponding to a display region refers to a portion of the liquid crystal mixture layer 140 having an orthogonal projection on the array substrate overlapping with an orthogonal projection of the display region on the array substrate 110.

A portion of the liquid crystal mixture layer 140 corresponding to a light transmission region includes a liquid crystal molecule regularly aligned and a polymerizable monomer. The portion of the liquid crystal mixture layer 140 corresponding to the light transmission region refers to a portion of the liquid crystal mixture layer 140 having an orthogonal projection on the array substrate overlapping with an orthogonal projection of the light transmission region on the array substrate 110.

In some embodiments, the liquid crystal mixture layer added in the transparent display panel may include, for example, a liquid crystal molecule, a polymerizable monomer molecule, and a photoinitiator. After the liquid crystal mixture layer is irradiated with ultraviolet light, the photoinitiator in regions irradiated by the ultraviolet light may cause the monomer molecule to polymerize to form an irregularly arranged cross-linked polymer network surrounding the liquid crystal molecule, and the liquid crystal molecule and the polymerizable monomer may still be regularly arranged in regions not irradiated with the ultraviolet light. Thus, in regions irradiated with the ultraviolet light, if an alignment of the liquid crystal molecule is perpendicular to the incident light of the light source, the regions can be configured to display images. That is, the regions may correspond to the display regions. In regions where no polymerization occurs, if an alignment of the liquid crystal molecule is parallel to the incident light of the light source, the regions may only be transmission regions, and cannot display. In the regions where no polymerization occurs, if the alignment of the liquid crystal molecule is perpendicular to the incident light of the light source, the regions may have a certain weak display. However, a display luminance of the certain weak display may be smaller than a display luminance of the polymerization regions, and thus may have nearly no influence on display of the polymerization regions. Accordingly, the regions where no polymerization occurs can be considered as having no display. In short, the regions not irradiated with the ultraviolet light may correspond to light transmission regions, and can be configured to transmit light and cannot be configured to display images.

The alignment of the liquid crystal molecule in the liquid crystal mixture layer may be, for example, parallel to a surface of the array substrate or perpendicular to the surface of the array substrate. If the alignment of the liquid crystal molecule is parallel to the surface of the array substrate, the display panel may include an advanced super dimension switch (ADS) type display panel. If the alignment of the liquid crystal molecule is perpendicular to the surface of the array substrate, the display panel may include a vertical alignment (VA) type display panel. The type of the display panel is not restricted in the present disclosure, and may be selected according to various application scenarios.

In some embodiments, in order to further ensure that a portion of the liquid crystal mixture layer corresponding to the light transmission region does not undergo a polymerization reaction, the above-described transparent display panel of the present disclosure may further include a first ultraviolet light blocking layer or a second ultraviolet light blocking layer or both the first and second ultraviolet light blocking layer. The first ultraviolet light blocking layer may be arranged over one side of the array substrate. The first ultraviolet light blocking layer may cover a portion of the array substrate or the entire array substrate, or may have an orthogonal projection on the array substrate overlapping with orthogonal projections of the light transmission regions on the array substrate. The second ultraviolet light blocking layer may be arranged over one side of the counter substrate. The second ultraviolet light blocking layer may cover a portion of the counter substrate or the entire counter substrate, or may have an orthogonal projection on the counter substrate overlapping with orthogonal projections of the light transmission regions on the counter substrate.

For example, as shown in FIG. 5, the transparent display panel includes both a first ultraviolet light blocking layer 151 and a second ultraviolet light blocking layer 152. The first ultraviolet light blocking layer 151 is located over one side of the array substrate 110 that faces toward the counter substrate 130. The second ultraviolet light blocking layer 152 is located over one side of the counter substrate 130 that faces toward the array substrate 110. In some other embodiments, the second ultraviolet light blocking layer 152 is located over one side of the counter substrate 130 that faces away from the array substrate 110.

In some other embodiments, the transparent display panel may include one ultraviolet light blocking layer, such as the first ultraviolet light blocking layer 151 over one side of the array substrate 110 that faces toward the counter substrate 130, or the second ultraviolet light blocking layer 152 over one side of the counter substrate 130. Further, the second ultraviolet light blocking layer 152 may be located over one side of the counter substrate 130 that faces toward the array substrate 110, or may be located over another side of the counter substrate 130 that faces away from the array substrate 110, which is not restricted here.

In some embodiments, the first ultraviolet light blocking layer 151 and the second ultraviolet light blocking layer 152 may be configured to block ultraviolet light and to prevent a polymerization of the monomer in the light transmission region, without blocking visible light transmission, i.e., without blocking the transmission of visible light. Thus, a material of the ultraviolet light blocking layer 151 and a material of the second ultraviolet light blocking layer 152 may include a transparent substance, e.g., a transparent metal oxide including indium tin oxide or the like, or a transparent polymer including at least one of salicylates, benzophenones, benzotriazoles, substituted acrylonitriles, triazines, or hindered amines. The material of the ultraviolet light blocking layer 151 and the material of the second ultraviolet light blocking layer 152 are not restricted in the present disclosure, and may be selected according to various application scenarios.

In some embodiments, the transparent display panel of the present disclosure may further include a pixel electrode layer arranged over one side of the array substrate or over one side of the counter substrate. Further, the pixel electrode layer may include a pixel electrode pattern only in the display region in each pixel region. As shown in FIG. 5, the transparent display panel includes a pixel electrode layer 160 arranged over one side of the array substrate 110 facing toward the counter substrate 130. That is, the array substrate 110 has one side facing toward the counter substrate 130 and an opposing side facing away from the counter substrate 130, and the pixel electrode layer 160 is arranged over the side facing toward the counter substrate 130. Further, in the pixel region, an orthogonal projection of the display region on the array substrate 110 overlaps with an orthogonal projection of the pixel electrode 160 on the array substrate 110.

After the pixel electrode is patterned, the entire transparent display panel can be irradiated with ultraviolet light, such that the monomer in the entire liquid crystal mixture layer may be polymerized. That is, the entire liquid crystal mixture layer may be filled with a randomly arranged polymer. By patterning pixel electrodes, the area ratio of the display region to the light transmission region in the different pixel regions may also be adjusted and controlled, and thus the luminance uniformity of the transparent display panel may be improved, without a need to selectively irradiate the transparent display panel.

Figure 6:
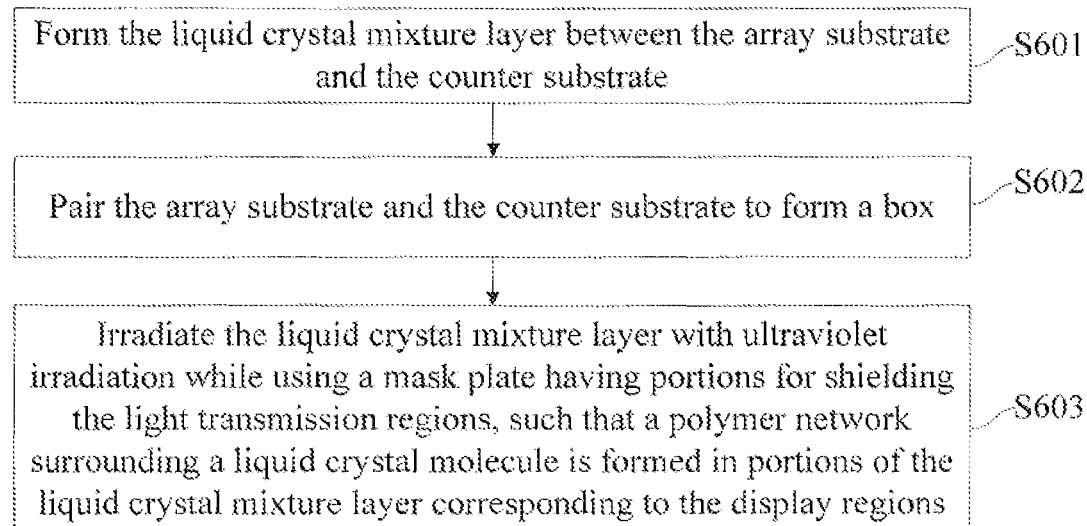
FIG. 6 illustrates a flow chart of an exemplary fabrication method for an exemplary transparent display panel according to various disclosed embodiments of the present disclosure and FIG. 7 illustrates a schematic view of an exemplary mask plate according to various disclosed embodiments of the present disclosure.

The present disclosure further provides a fabrication method for the above-described transparent display panel of the disclosure. FIG. 6 illustrates a flow chart of an exemplary fabrication method for an exemplary transparent display panel according to various disclosed embodiments of the present disclosure. The fabrication method is described below with reference to FIG. 6.

At S601, the liquid crystal mixture layer is formed between the array substrate and the counter substrate by, for example, dripping. The liquid crystal mixture may include a liquid crystal molecule and a polymerizable monomer.

At S602, the array substrate and the counter substrate are paired to form a box.

At S603, the liquid crystal mixture layer is irradiated with ultraviolet irradiation while using a mask plate having portions for shielding the light transmission regions, such that a polymer network surrounding a liquid crystal molecule is formed in portions of the liquid crystal mixture layer corresponding to the display regions. The portions of the liquid crystal mixture layer corresponding to the display regions refer to portions of the liquid crystal mixture layer having orthogonal projections on the array substrate overlapping with orthogonal projections of the display regions on the array substrate. Accordingly, the liquid crystal mixture layer is irradiated under the mask with ultraviolet light, such that a polymerization degree of first portions of the liquid crystal mixture is greater than a polymerization degree of second portions of the liquid crystal mixture. The first portions of the liquid crystal mixture layer are in the display regions. The second portions of the liquid crystal mixture layer are in the light transmission regions.

Further, in order to realize the selective ultraviolet light irradiation on the liquid crystal mixture layer, the transparent liquid crystal panel may need to be irradiated by ultraviolet light after the fabrication of the transparent display panel, such that the monomer molecule in portions of the liquid crystal mixture layer corresponding to the display regions may be polymerized, and a random cross-linked polymer network may be formed. The monomer molecule in portions of the liquid crystal mixture layer corresponding to the light transmission regions may not undergo a polymerization reaction and remains in the monomer state. The mask plate may include regions that allow the transmission of the ultraviolet light for forming display regions in the liquid crystal mixture layer, and regions that block the transmission of the ultraviolet light for forming light transmission regions in the liquid crystal mixture layer, i.e., non-display regions in the liquid crystal mixture layer.

The scattering degree of a portion of the liquid crystal mixture may be positively correlated with the polymerization degree of the portion of the liquid crystal mixture. The scattering degree may be reduced if the polymerization degree is decreased, The scattering degree may be increased if the polymerization degree is increased. The polymerization degree of a portion of the liquid crystal mixture may be adjusted by, for example, controlling whether or not the portion is irradiated by the ultraviolet light or controlling a time duration during which the portion is irradiated by the ultraviolet light.

Figure 7:
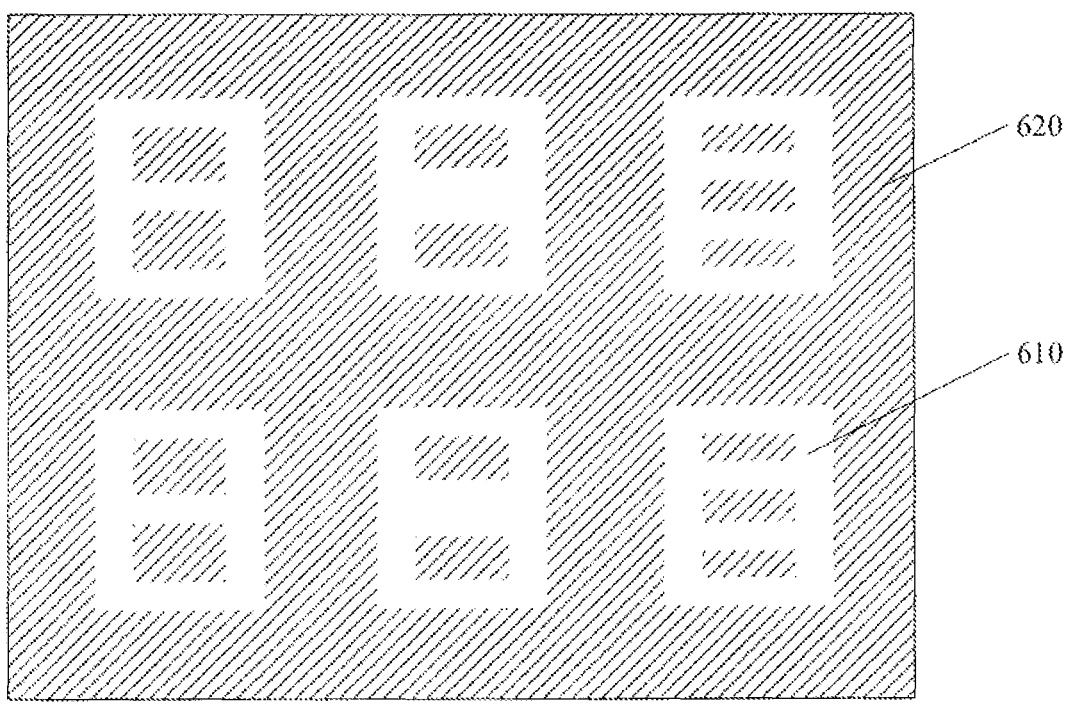

FIG. 7 illustrates a schematic view of an exemplary mask plate according to various disclosed embodiments of the present disclosure. As shown in FIG. 7, a white unshaded portion 610 in the exemplary mask plate is used for forming a display region in the liquid crystal mixture layer, and a shaded portion 620 in the exemplary mask plate is used for forming a light transmission region in the liquid crystal mixture layer, i.e., a non-display region in the liquid crystal mixture layer.

The present disclosure also provides a display device. As shown in FIGS. 1A and 1B, the display device includes the transparent display panel 1 of the present disclosure, and one or more edge-lit light sources 2 arranged over at least one side of the transparent display panel 1. The display device can be, for example, a mobile phone, a tablet computer, a notebook computer, a desktop computer, a television, a navigator, or another suitable product or component having a display function. Because the display device may work under similar principles as the display panel, for details about the display device, reference can be made to above descriptions of the display panel, which are not repeated here. The transparent display panel 1 and the one or more edge-lit light sources 2 arranged over at least one side of the transparent display panel 1 can also be considered as being included in an area light source that is included in the display device. That is, the display device includes the area light source that further includes the transparent panel 1 and one or more edge-lit light sources 2 arranged over at least one side of the transparent panel 1.

In some embodiments, in the above-described display device of the disclosure, the area ratio of the display region to the light transmission region in the pixel region may gradually increase, as the distance between the pixel region and the edge-lit light source arranged over a side of the transparent display panel increases. Accordingly, the display device may include, for example, the following circumstances according to the number of edge-lit light sources.

In some embodiments, as shown in FIG. 1A, the edge-lit light source 2 is located over one side of the transparent display panel 1. In these embodiments, the area ratio of the display region 121 to the light transmission region 122 in the pixel region 120 is gradually increased, along a direction from the side provided with the edge-lit light source 2 to an opposing side.

In some other embodiments, as shown in FIG, 133, edge-lit light sources 2 are arranged over two opposite sides of the transparent display panel 1. In these embodiments, the area ratio of the display region 121 to the light transmission region 122 in the pixel region 120 is gradually increased, along a direction from each of the two sides provided with the edge-lit light sources 2 to a central axis of the display panel 1.

In some other embodiments, when edge-lit light sources are arranged over four sides of the transparent display panel (not shown in a figure), in the transparent display panel, the area ratio of the display region to the light transmission region in the pixel region may be gradually increased, along a direction from each of the four sides provided with the edge-lit light sources to a central point of the display panel.

When the edge-lit light sources 2 are located over two opposite sides of the transparent display panel 1, the two opposite sides of the transparent display panel 1 are not limited to the left side and the right side of the transparent display panel 1 where the two edge-lit light sources 2 shown in FIG. 1B are located. The edge-lit light sources 2 may be located over upper and lower sides of the transparent display panel 1. In the present disclosure, the two opposite sides of the transparent display panel 1 where the two edge-lit light sources 2 are located are not restricted, may include two sides of the transparent display panel 1 opposite to each other, and may be selected according to various application scenarios.

In some embodiments, when one or more edge-lit light sources are located over one side or two opposite sides of the transparent display panel, the liquid crystal molecule in the liquid crystal mixture layer may have dual-domain alignment. That is, the alignment of the liquid crystal molecule may be parallel to the incident light or perpendicular to the incident light. In some other embodiments, when edge-lit light sources are located over four sides of the transparent display panel, the liquid crystal molecule in the liquid crystal mixture layer may have multi-domain alignment, facilitating an efficient use of incident light of the four edge-lit light sources, and improving luminance of the display panel.

In some embodiments, each of at least one side-lit light source of the display device may include a red light sub-source, a green light sub-source, and a blue light sub-source. Further, the red light sub-source, the green light sub-source, and the blue light sub-source emit red light, green light, and blue light sequentially. The red light, the green light, and the blue light may be superimposed to form a color light. Correspondingly, the use of color filters may be reduced or suppressed, a light source efficiency may be improved, a resolution may be improved, and cost may be reduced.

In some other embodiments, each of the at least one side-lit light source of the display device may include a white light source providing white light. The transparent display panel of the display device further includes a color filter film arranged in a light-emission direction. The color filter film includes a plurality of red filters, a plurality of green filters, and a plurality of blue filters. Red light, green light, and blue light may be formed by passing white light from a display region through the color filter film. Further, the red light, the green light, and the blue light may be superimposed to form color light.

Further, the color filter film may include a color filter film of a quantum dot type or an organic light-emitting material type over a light-emission direction. The color filter film of the quantum dot type may include different types of quantum dots and/or quantum dots of different sizes to emit red light, green light, and blue light under excitations of light from the transparent display panel. Further, the red light, the green light, and the blue light may be superimposed to form color light. The color filter film of the organic light-emitting material type may include different types of organic light-emitting materials to emit red light, green light, and blue light under excitations of light from the transparent display panel. Further, the red light, the green light, and the blue light may be superimposed to form color light.

The structures shown in FIGS. 1A and 1B can also be considered as being included. in an area light source of the present disclosure. The area light source may be included in a display device of the present disclose.

The area light source may include a transparent panel consistent with the disclosure and at least one side-lit light source located over the at least one side of the transparent panel.

In some embodiments, as shown in FIG. 1A, in the area light source, the edge-lit light source 2 is located over one side of the transparent display panel 1. In these embodiments, the area ratio of the display region 121 to the light transmission region 122 in the pixel region 120 is gradually increased, along a direction from the side provided with the edge-lit light source 2 to an opposing side.

In some other embodiments, as shown in FIG. 1B, in the area light source, edge-lit light sources 2 are arranged over two opposite sides of the transparent display panel 1. In these embodiments, the area ratio of the display region 121 to the light transmission region 122 in the pixel region 120 is gradually increased, along a direction from each of the two sides provided with the edge-lit light sources 2 to a central axis of the display panel 1.

In some other embodiments, edge-lit light sources are arranged over four sides of the transparent display panel (not shown in a figure). In these embodiments, in the transparent display panel, the area ratio of the display region to the light transmission region in the pixel region may be gradually increased, along a direction from each of the four sides provided with the edge-lit light sources to a central point of the display panel.

In an area light source, when the edge-lit light sources 2 are located over two opposite sides of the transparent display panel 1, the two opposite sides of the transparent display panel 1 are not limited to the left side and the right side of the transparent display panel 1 where the two edge-lit light sources 2 shown in FIG. 1B are located. The edge-lit light sources 2 may be located over upper and lower sides of the transparent display panel 1. In the present disclosure, the two opposite sides of the transparent display panel 1 where the two edge-lit light sources 2 are located are not restricted, may include two sides of the transparent display panel 1 opposite to each other, and may be selected according to various application scenarios.

In some embodiments, in the area light source, when one or more edge-lit light sources are located over one side or two opposite sides of the transparent display panel, the liquid crystal molecule in the liquid crystal mixture layer may have dual-domain alignment. That is, the alignment of the liquid crystal molecule may be parallel to the incident light or perpendicular to the incident light. In some other embodiments, when edge-lit light sources are located over four sides of the transparent display panel, the liquid crystal molecule in the liquid crystal mixture layer may have multi-domain alignment, facilitating an efficient use of incident light of the four edge-lit light sources, and improving luminance of the display panel.

For more details of the area light source, reference can be made to above descriptions of the structures shown in FIGS. 1A and 1B.

In some embodiments, in a display device that includes an area light source consistent with the disclosure, each of at least one side-lit light source of the display device may include a red light sub-source, a green light sub-source, and a blue light sub-source. Further, the red light sub-source, the green light sub-source, and the blue light sub-source emit red light, green light, and blue light sequentially. The red light, the green light, and the blue light may be superimposed to form a color light. Correspondingly, the use of color filters may be reduced or suppressed, a light source efficiency may be improved, a resolution may be improved, and cost may be reduced.

In some other embodiments, in a display device that includes an area light source consistent with the disclosure, each of the at least one side-lit light source of the display device may include a white light source providing white light. The transparent display panel of the display device further includes a color filter film arranged in a light-emission direction. The color filter film includes a plurality of red filters, a plurality of green filters, and a plurality of blue filters. Red light, green light, and blue light may be formed by passing white light from a display region through the color filter film. Further, the red light, the green light, and the blue light may be superimposed to form color light.

Further, the color filter film may include a color filter film of a quantum dot type or an organic light-emitting material type over a light-emission direction. The color filter film of the quantum dot type may include different types of quantum dots and/or quantum dots of different sizes to emit red light, green light, and blue light under excitations of light from the transparent display panel. Further, the red light, the green light, and the blue light may be superimposed to form color light. The color filter film of the organic light-emitting material type may include different types of organic light-emitting materials to emit red light, green light, and blue light under excitations of light from the transparent display panel. Further, the red light, the green light, and the blue light may be superimposed to form color light The present disclosure provides transparent panel, fabrication method thereof, area light source and display device. The transparent display panel may include an array substrate and a counter substrate opposite to each other. A plurality of pixel regions may be arranged in an array and arranged between the array substrate and the counter substrate. Each pixel region may include a display region and a light transmission region. An area ratio of the display region to the light transmission region in the display region may be increased, with an increasing distance between the display region and at least one edge-lit light source arranged over at least one side of the transparent display panel. The relative area of the display region may be increased in the pixel region farther from the light source by adjusting the area ratio of the display region to the light transmission region in the pixel region. Accordingly, an influence of a pixel region near the light source on luminance of a pixel region away from the light source may be reduced, and the luminance of the pixel region away from the light source may be increased. Thus, the luminance difference caused by the light loss may be compensated, and the luminance uniformity of the entire display panel may be improved.

The present disclosure provides transparent panel, fabrication method thereof, area light source and display device. A relative area of a display region may be increased in a pixel region farther from an edge-lit light source by adjusting an area ratio of the display region to a light transmission region in the pixel region. Accordingly, an influence of a pixel region near the edge-lit light source on luminance of a pixel region away from the edge-lit light source may be reduced, and the luminance of the pixel region at a distance away from the edge-lit light source may be increased. Thus, the luminance difference caused by the light loss may be compensated, and the luminance uniformity of the entire display panel may be improved.

The foregoing description of the embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto in which all terms are meant in their broadest reasonable sense unless otherwise indicated. Therefore, the term "the disclosure," "the present disclosure," or the like does not necessarily limit the claim scope to a specific embodiment, and the reference to exemplary embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A transparent panel comprising:
    a first substrate;
    a second substrate opposite to the first substrate; and
    a plurality of pixel regions between the first substrate and the second substrate,
    wherein a respective pixel region of the pixel regions includes a first region and a second region, a scattering degree of the first region being greater than a scattering degree of the second region, and
    an area ratio of the first region to the second region in the respective pixel region increases as a distance between the respective pixel region and at least one side of the transparent panel increases;
    in at least a portion of the transparent panel, the second region of the respective pixel region comprises an outer sub-region and a plurality of inner sub-regions;
    the first region is surrounded by the outer sub-region;
    the first region surrounds the plurality of inner sub-regions, spacing apart the plurality of inner sub-regions from the outer sub-region;
    the plurality of inner sub-regions are partitioned by the first region into discrete and separate second sub-regions;
    a total area of the plurality of inner sub-regions in the respective pixel region decreases as the distance between the respective pixel region and at least one side of the transparent panel increases;
    a total area surrounded by the outer sub-region in the respective pixel region remains substantially the same as the distance between the respective pixel region and at least one side of the transparent panel increases; and
    a total area of the outer sub-region in the respective pixel region remains substantially the same as the distance between the respective pixel region and at least one side of the transparent panel increases.

2. The transparent panel according to claim 1, wherein the area ratio increases evenly as the distance between the respective pixel region and the at least one side of the transparent panel increases.

3. The transparent panel according to claim 1, wherein area ratios in pixel regions having same distances from the at least one side of the transparent panel are the same.

4. The transparent panel according to claim 1, wherein:
    an area of the first region in one of the pixel regions that is farthest from the at least one side of the transparent panel is a first area,
    an area of the first region in another one of the pixel regions that is closest to the at least one side of the transparent panel is a second area, and
    a ratio of the first area to the second area is greater than approximately 1, and smaller than or equal to approximately 5.

5. The transparent panel according to claim 1, wherein a pattern of the second region is adjacent to a pattern of the first region in at least one of the pixel regions.

6. The transparent panel according to claim 5, wherein the first region includes a continuous pattern or a plurality of discrete patterns in the at least one of the pixel regions.

7. The transparent panel according to claim 1, further comprising:
    a liquid crystal mixture layer between the first substrate and the second substrate, the liquid crystal mixture layer including first portions in the first regions and second portions in the second regions, wherein:

a polymerization degree of the first portions is greater than a polymerization degree of the second portions, the first portions of the liquid crystal mixture layer include a liquid crystal molecule aligned perpendicular to a surface of the transparent panel and a polymer network, and the second portions of the liquid crystal mixture layer include a liquid crystal molecule and a polymerizable monomer.

8. The transparent panel according to claim 7, further comprising:

at least one of an ultraviolet light blocking layer over one side of the first substrate or an ultraviolet light blocking layer over one side of the second substrate.

9. The transparent panel according to claim 7, further comprising:

an electrode layer arranged over one side of the first substrate or over one side of the second substrate, wherein the electrode layer includes a plurality of electrode patterns in one or more first regions.

10. The transparent panel according to claim 1, further comprising:

an electrode layer arranged over one side of the first substrate or over one side of the second substrate, wherein the electrode layer includes a plurality of electrode patterns, the plurality of electrode patterns being in one or more first regions.

11. An area light source comprising:

the transparent panel according to claim 1; and at least one side-lit light source located over the at least one side of the transparent panel.

12. The area light source according to claim 11, wherein the area ratio of the first region to the second region in the respective pixel region gradually increases along a direction from the at least one side of the transparent panel to an opposing side of the transparent panel.

13. The area light source according to claim 11, wherein the side-lit light source is a first side-lit light source and the one side is a first side of the transparent panel, the area light source further comprising:

a second side-lit light source arranged over a second side of the transparent panel that is opposite to the first side of the transparent panel, wherein the area ratio of the first region to the second region in the respective pixel region gradually increases along directions from the first side and the second side to a central axis of the transparent panel.

14. The area light source according to claim 13, further comprising:

a third side-lit light source arranged over a third side of the transparent panel that is nonparallel to the first side and the second side; and a fourth side-lit light source arranged over a fourth side of the transparent panel that is opposite to the third side of the transparent panel, wherein the area ratio of the first region to the second region in the respective pixel region gradually increases along directions from the first side, the second side, the third side, and the fourth side to a central point of the panel.

15. A display device comprising the area light source according to claim 11, wherein:

each of the at least one side-lit light source includes a red light sub-source, a green light sub-source, and a blue light sub-source; and the red light sub-source, the green light sub-source, and the blue light sub-source emit red light, green light, and blue light sequentially to form color light by superimposing the red light, the green light, and the blue light.

16. A display device comprising the area light source according to claim 11, wherein:

each of the at least one side-lit light source includes a white light source providing white light;

the transparent panel further includes a color filter film over a light-emission direction and including a plurality of red filters, a plurality of green filters, and a plurality of blue filters, red light, green light, and blue light are formed by passing white light through the color filter film; and the red light, the green light, and the blue light are superimposed to form color light.

17. The display device according to claim 16, wherein:

the color filter film is a color filter film of a quantum dot type or an organic light-emitting material type.

18. A method of fabricating the transparent panel according to claim 1, comprising:

forming a liquid crystal mixture layer between the first substrate and the second substrate, the liquid crystal mixture including a liquid crystal molecule and a polymerizable monomer; and irradiating the liquid crystal mixture layer with ultraviolet light, such that a polymerization degree of the liquid crystal mixture layer in the first region is greater than a polymerization degree of the liquid crystal mixture layer in the second region.

19. The method according to claim 18, wherein irradiating the liquid crystal mixture layer with ultraviolet light includes:

irradiating the liquid crystal mixture layer with ultraviolet light using a mask plate including portions for shielding the second regions.

* * * * *